(12) United States Patent
Stahl et al.

(10) Patent No.: US 10,900,612 B2
(45) Date of Patent: Jan. 26, 2021

(54) CRYOGENIC PRESSURE CONTAINER

(71) Applicant: Bayerische Motoren Werke Aktiengesellschaft, Munich (DE)

(72) Inventors: Hans-Ulrich Stahl, Munich (DE); Lorenz Ehgartner, Garching (DE); Simon Hettenkofer, Munich (DE); Klaas Kunze, Poing (DE); Timo Gutmann, Bad Kohlgrub (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 482 days.

(21) Appl. No.: 15/606,278

(22) Filed: May 26, 2017

(65) Prior Publication Data
US 2017/0261159 A1   Sep. 14, 2017

Related U.S. Application Data

(63) Continuation of application No. PCT/EP2015/077216, filed on Nov. 20, 2015.

(30) Foreign Application Priority Data

Dec. 3, 2014  (DE) .......................... 10 2014 224 783
Jul. 20, 2015  (DE) .......................... 10 2015 213 563

(51) Int. Cl.
*F17C 1/16*   (2006.01)
*F17C 13/08*   (2006.01)
(Continued)

(52) U.S. Cl.
CPC .............. *F17C 13/086* (2013.01); *F17C 1/00* (2013.01); *F17C 3/08* (2013.01); *F17C 9/02* (2013.01);
(Continued)

(58) Field of Classification Search
CPC ........... B60K 2015/03309; B60K 2015/03315; F17C 13/025; F17C 13/086;
(Continued)

(56) References Cited

U.S. PATENT DOCUMENTS

| | | |
|---|---|---|
| 3,007,596 A | 11/1961 | Matsch |
| 3,416,693 A | 12/1968 | Covington et al. |
| 3,930,375 A | 1/1976 | Hofmann |
| 2007/0114234 A1 | 5/2007 | Bauer et al. |

FOREIGN PATENT DOCUMENTS

| | | |
|---|---|---|
| DE | 103 35 246 A1 | 2/2005 |
| DE | 10 2004 011 653 A1 | 9/2005 |

(Continued)

OTHER PUBLICATIONS

Chinese-language Office Action issued in counterpart Chinese Application No. 201580055080.3 dated Feb. 22, 2019 with English translation (13 pages).

(Continued)

*Primary Examiner* — Stephen J Castellano
(74) *Attorney, Agent, or Firm* — Crowell & Moring LLP

(57) ABSTRACT

A cryogenic pressure container for a motor vehicle has an inner container and an outer container. An evacuated space is arranged between the inner container and the outer container at least in some regions. The inner container has a synthetic material layer. A barrier layer is arranged at least in some regions between the synthetic material layer and the evacuated space. The barrier layer is designed and arranged so as to at least reduce the transfer of constituents leaking out of the synthetic material layer into the evacuated space, wherein a gap is formed at least in some regions between the barrier layer and the synthetic material layer.

11 Claims, 2 Drawing Sheets

(51) Int. Cl.
    *F17C 3/08*     (2006.01)
    *F17C 1/00*     (2006.01)
    *F17C 9/02*     (2006.01)
    *F17C 13/02*     (2006.01)
    *F16J 12/00*     (2006.01)

(52) U.S. Cl.
    CPC ............. *F17C 13/025* (2013.01); *F16J 12/00* (2013.01); *F17C 2201/0104* (2013.01); *F17C 2201/035* (2013.01); *F17C 2203/032* (2013.01); *F17C 2203/0308* (2013.01); *F17C 2203/0391* (2013.01); *F17C 2203/0604* (2013.01); *F17C 2203/0629* (2013.01); *F17C 2203/0636* (2013.01); *F17C 2203/0639* (2013.01); *F17C 2203/0646* (2013.01); *F17C 2203/0663* (2013.01); *F17C 2221/011* (2013.01); *F17C 2223/0161* (2013.01); *F17C 2223/036* (2013.01); *F17C 2260/033* (2013.01); *F17C 2270/0168* (2013.01)

(58) Field of Classification Search
    CPC ...... F17C 2203/0604; F17C 2223/0161; F17C 2270/0168; F17C 2203/0308
    See application file for complete search history.

(56) References Cited

FOREIGN PATENT DOCUMENTS

| | | |
|---|---|---|
| DE | 10 2005 055 321 A1 | 5/2007 |
| DE | 10 2008 019 594 A1 | 10/2009 |
| EP | 1 546 601 B1 | 6/2005 |
| WO | WO 2004/029503 A2 | 4/2004 |

OTHER PUBLICATIONS

International Search Report (PCT/ISA/210) issued in PCT Application No. PCT/EP2015/077216 dated Feb. 25, 2016 with English translation (five pages).

German-language Written Opinion (PCT/ISA/237) issued in PCT Application No. PCT/EP2015/077216 dated Feb. 25, 2016 (six pages).

German Search Report issued in counterpart German Application No. 10 2015 213 563.2 dated Feb. 29, 2016 with partial English translation (11 pages).

Chinese-language Office Action issued in counterpart Chinese Application No. 201580055080.3 dated Jul. 2, 2018 with English translation (12 pages).

Cover page of EP 1 546 601 A0 published Jun. 29, 2005 (one (1) page).

CRYOGENIC PRESSURE CONTAINER

CROSS REFERENCE TO RELATED APPLICATIONS

This application is a continuation of PCT International Application No. PCT/EP2015/077216, filed Nov. 20, 2015, which claims priority under 35 U.S.C. § 119 from German Patent Application No. 10 2014 224 783.7, filed Dec. 3, 2014, and 10 2015 213 563.2, filed Jul. 20, 2015, the entire disclosures of which are herein expressly incorporated by reference.

BACKGROUND AND SUMMARY OF THE INVENTION

The technology disclosed here relates to a cryogenic pressure container.

Cryogenic pressure containers are known from the prior art. A pressure container of this type has an inner container and, surrounding this, an outer container, thus forming an evacuated (inter)space. Cryogenic pressure containers are used for example for motor vehicles in which a fuel that is gaseous under ambient conditions is stored cryogenically and thus in the liquid or supercritical state, in essence therefore with a much higher density than under ambient conditions.

Fuels of this type are stored, for example, at temperatures of approximately 30 K to 330 K in the cryogenic pressure containers. If the pressure container is insufficiently insulated, the fuel stored in an unused vehicle gradually heats up. This is accompanied by a gradual and simultaneous increase in the pressure in the pressure container. If it exceeds a limit pressure, the fuel must escape via a safety valve in order to avoid the cryogenic pressure container bursting. Pressure containers therefore require extremely good thermal insulation in order to prevent, as far as possible, undesired heat input into the cryogenically stored medium. Highly effective insulating shells, including for example a vacuum shell, are therefore provided in order to prevent heat input. For example, EP 1 546 601 B1 discloses one such cryogenic pressure container. The Applicant's DE 10 2005 055 321 A1 discloses a container having a metallic or ceramic coating. DE 10 2004 011 653 A1 discloses a pressure container with a gas-tight radiation shield.

The technology disclosed here has the object of improving a cryogenic pressure container, or of providing an alternative embodiment.

This and other objects are achieved by a cryogenic pressure container for a motor vehicle, having an inner container and an outer container. Between the inner container and the outer container there is arranged, at least in certain regions, an evacuated space. The inner container has a synthetic material layer. Between the synthetic material layer and the evacuated space there is arranged, at least in certain regions, a barrier layer. The barrier layer is formed and arranged such that it at least reduces the transition of constituents escaping from the synthetic material layer into the evacuated space, wherein a gap is formed at least in certain regions between the barrier layer and the synthetic material layer.

The technology disclosed here relates to a cryogenic pressure container for a motor vehicle. Preferably, the pressure container stores fuels at temperatures below 350 K, particularly preferably below 300 K.

Such a cryogenic pressure container has an inner container and an outer container. The fuel is stored in the inner container. The outer container preferably closes the pressure container in the outward direction. Between the inner container and the outer container there is arranged, at least in certain regions, an evacuated (inter)space V. This space V is largely evacuated. The evacuated space V provides particularly good heat insulation. The inner container has a synthetic material layer. The synthetic material layer is preferably formed on a liner of the inner container. Between the synthetic material layer and the evacuated space V there is arranged, at least in certain regions, a barrier layer. The barrier layer is formed and arranged such that the barrier layer at least reduces, and preferably even entirely prevents, the transition of constituents escaping from the synthetic material layer into the evacuated space V.

Synthetic materials have a tendency to outgas when in a vacuum. As used herein, the term synthetic material includes all types of plastics/polymers including those processed from natural materials. Any inclusions in the synthetic material gradually leach into the vacuum. The constituents of the synthetic material layer, for example gas inclusions trapped during production of the synthetic material layer, passing into the vacuum reduce the insulating properties of the evacuated space V. Localized residues of starting materials (resins and hardeners) which have not completely reacted away, or assistants which have a disadvantageous vapor pressure curve, have a negative effect on the vacuum. Thus, the thermal properties of the cryogenic pressure container therefore deteriorate over time due to this outgassing. In accordance with the technology disclosed here, a barrier layer is provided between the synthetic material layer and the evacuated space V. As a result, only relatively small quantities of, or even no constituents of, the synthetic material layer pass into the evacuated space V, such that the container insulation can be markedly improved or remains more stable over time.

The synthetic material layer can be made as a fiber-reinforced synthetic laminate. The fiber-reinforced synthetic laminate preferably surrounds the liner. An aluminum liner or steel liner can, for example, be used as the liner. More preferably, the liner can itself be made of a fiber-reinforced synthetic laminate, or the fiber-reinforced synthetic laminate itself includes the liner. The fuel can be stored cryogenically in the interior I of the liner. A fiber-reinforced synthetic laminate of this kind substantially increases the strength of the inner container.

Preferably, the inner container is designed to store a fluid at a pressure of approximately 0 bar to approximately 900 bar, more preferably at a pressure of approximately 5 bar to approximately 750 bar, and particularly preferably at a pressure of approximately 20 bar to approximately 350 bar.

The barrier layer can separate the fiber-reinforced synthetic laminate from the evacuated space V in an essentially gas-tight manner. In particular during the production of a fiber-reinforced synthetic laminate, for example by winding and/or braiding, there are often gas inclusions that cannot be entirely removed. In the case of the technology disclosed here, these gas inclusions would not have a negative effect on the long-term insulating properties of the pressure container. At the same time, the relatively high inner container pressures, combined with the low temperatures, allow a relatively large quantity of fuel to be stored in the inner container.

Advantageously, the barrier layer itself represents the limit or the outermost layer of the inner container with respect to the evacuated space V.

The barrier layer itself preferably has an outgassing-free material, at least facing the evacuated space V. This limit is advantageously made of an outgassing-free material, so as to avoid deterioration of the insulation by barrier layer outgassing. The barrier layer can be made of a metal, in particular of aluminum, steel and/or copper and alloys thereof.

Advantageously, the barrier layer can be formed as a surface coating. The barrier layer can, for example, have the same thermal expansion coefficient as the synthetic material layer.

A gap can also be formed at least in certain regions between the barrier layer and the synthetic material layer. Such a gap can, for example, be dimensioned such that it is possible to compensate for different thermal expansions of different material layers, for example the liner, the synthetic material layer and/or the barrier layer. It is also possible for outgassings to collect in the gap. Preferably, the gap is formed such that outgassings cannot pass into the evacuated space.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1A is an enlarged view of detail A in FIG. 1.

DETAILED DESCRIPTION OF THE DRAWINGS

Figure 1:
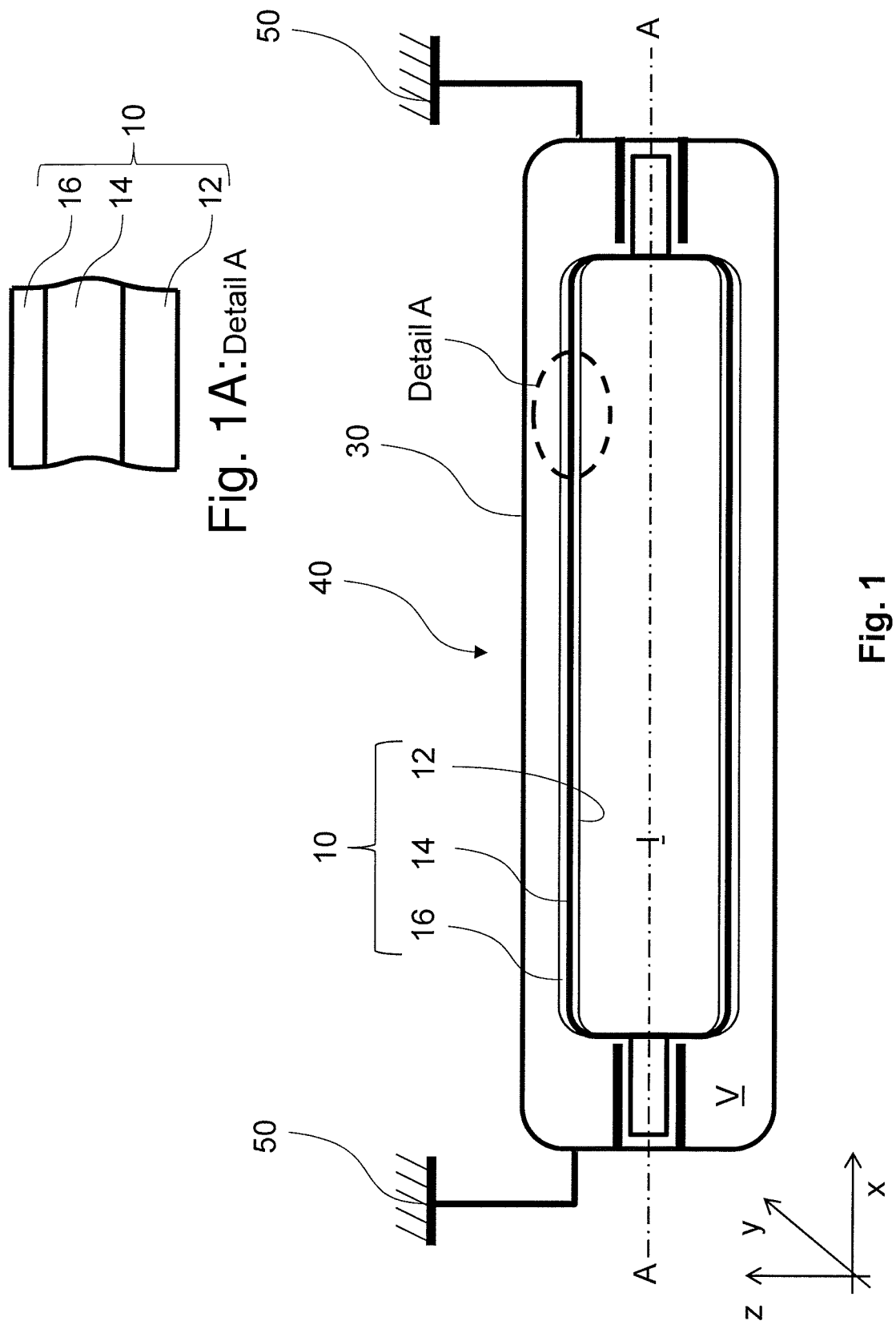
FIG. 1 is a schematic cross section view of a cryogenic pressure container 40.

FIG. 1 shows a cryogenic pressure container 40 which, in this case, is attached to the vehicle body (not shown) by two mounts 50. The pressure container 40 has an inner container 10 and an outer container 30. The inner container 10 is arranged inside the outer container 30. An evacuated space V is arranged between the inner container 10 and the outer container 30. The two ends of the inner container 10 connect the latter to the outer container 30.

FIG. 1A is an enlarged view of the structure of the inner container 10. The barrier layer 16, which in this case surrounds the fiber-reinforced synthetic laminate 14 entirely and in a leak-tight manner, is arranged radially outward. It can also be provided that only one part, for example the cylindrical region, of the liner 12 is surrounded by the synthetic laminate 14. It would then also be sufficient for only this region to be surrounded by the barrier layer 16. The synthetic laminate 14 surrounds the liner 12, which in this case takes the form of an aluminum liner 12. For example, this laminate layer 14 can have been applied using a winding method. The barrier layer 16 prevents any inclusions or locally present constituents with a disadvantageous vapor pressure curve, which may be present in the synthetic laminate 14, from passing into the evacuated space V. This makes it possible to create a cryogenic pressure container 40 with a relatively large fluid storage volume and relatively good long-term heat insulation.

Figure 2:
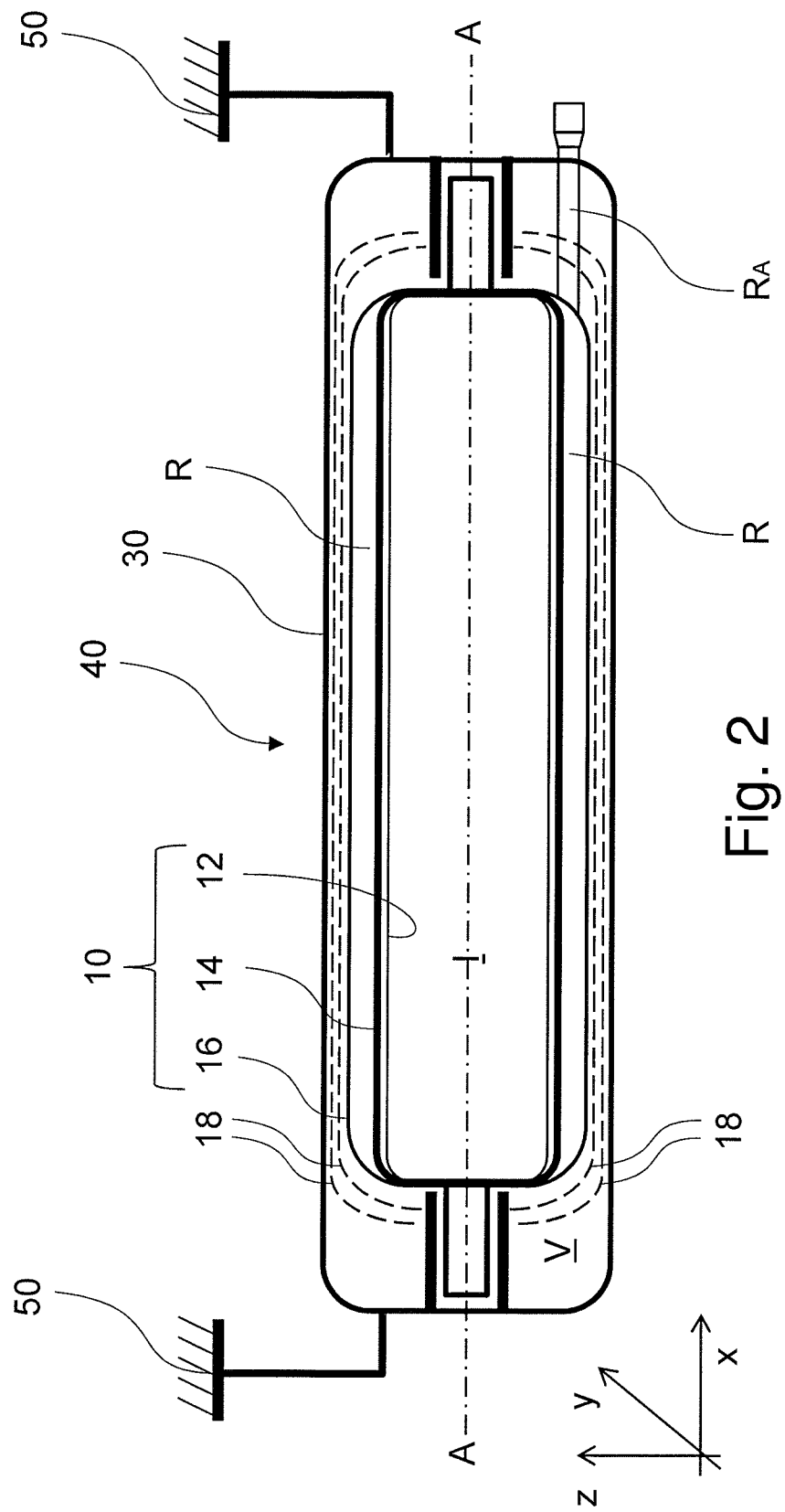
FIG. 2 is another schematic cross section view of the pressure container 40.

FIG. 2 shows a similar pressure container 40 to that in FIGS. 1 and 1A. Therefore, only the differences and additions are set out below. One difference with respect to the first example is that here a gap is formed between the barrier layer 16 and the synthetic material layer 14. This gap can extend over the entire circumferential or jacket region of the inner container 10, and project into the side regions of the inner container 30. Here, the gap forms a gas-tight space R. Gases, which for example have diffused out of the synthetic material layer 14, can collect in the space R. Expediently, the pressure container 40 is formed such that the gas composition in the gas-tight space R can be evaluated from the outside. To that end, sensors installed in the space R could be used. Particularly preferably, the gas-tight space R includes at least one testing connection $R_A$ which further leads out of the outer container 30. This makes it easy to monitor the outgassing. Alternatively or in addition, this testing connection can be used to evacuate the gas-tight space R, at least to a certain degree. It then serves as an evacuation connection. At least one radiation insulation 18 can be arranged outside the barrier layer 16. A synthetic liner 12 can, for example, be used here as the liner 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cryogenic pressure container for a motor vehicle, comprising:
    an inner container having a synthetic material layer;
    an outer container;
    an evacuated space provided, at least in certain regions, between the inner container and the outer container;
    a barrier layer arranged, at least in certain regions, between the synthetic material layer and the evacuated space;
    a gap formed at least in certain regions between the barrier layer and the synthetic material layer, wherein the gap contains constituents escaping from the synthetic material layer;
    wherein the barrier layer is formed and arranged so as to at least reduce a transition of the constituents escaping from the synthetic material layer into the evacuated space.

2. The pressure container as claimed in claim 1, wherein the synthetic material layer is a fiber-reinforced synthetic laminate which surrounds a liner.

3. The pressure container as claimed in claim 2, wherein the barrier layer separates the fiber-reinforced synthetic laminate from the evacuated space in an essentially gas-tight manner.

4. The pressure container as claimed in claim 3, wherein the barrier layer is made of a metal.

5. The pressure container as claimed in claim 2, wherein the barrier layer has an outgassing-free material facing the evacuated space.

6. The pressure container as claimed in claim 1, wherein the barrier layer has an outgassing-free material facing the evacuated space.

7. The pressure container as claimed in claim 1, wherein the barrier layer is made of a metal.

8. The pressure container as claimed in claim 1, wherein the pressure container is formed such that a composition of gas in the gap is evaluatable from outside the pressure container.

9. The pressure container as claimed in claim 8, wherein the gap comprises at least one testing connection, and the testing connection leads out of the outer container.

10. The pressure container as claimed in claim 1, wherein the gap comprises at least one testing connection, and the testing connection leads out of the outer container.

11. The pressure container as claimed in claim 1 further comprising at least one radiation insulation arranged outside the barrier layer.

\* \* \* \* \*